Patented Jan. 3, 1933

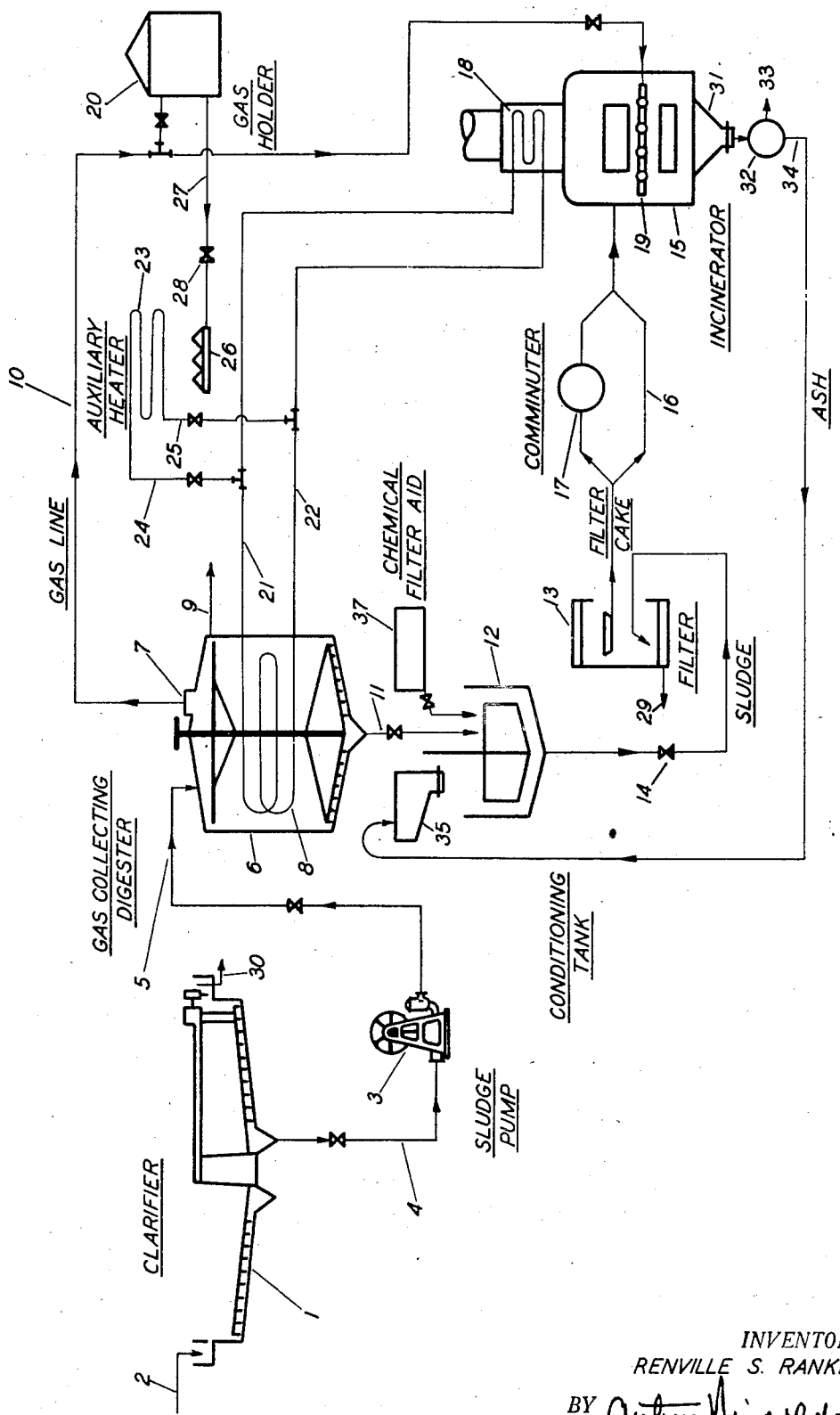

1,892,681

UNITED STATES PATENT OFFICE

RENVILLE S. RANKIN, OF HASTINGS UPON HUDSON, NEW YORK, ASSIGNOR, BY MESNE ASSIGNMENTS, TO THE DORR COMPANY, INC., OF NEW YORK, N. Y., A CORPORATION OF DELAWARE

SEWAGE DISPOSAL

Application filed September 27, 1930. Serial No. 484,722.

My invention relates to sewage disposal and has particular reference to final disposal of the sludge resulting from sewage sedimentation by dewatering and incinerating.

The usual sewage disposal system or plant requires the use of a digester sufficiently large to store the entire volume of sludge produced during the time required for complete digestion, with sludge beds of relatively large area, and additional facilities for removing the residue from the beds and transporting it away from the plant. Burning has been suggested in place of hauling the sludge away from the beds, but this requires the use of gas, oil or other fuel furnished from an outside source with consequent additional expense in plant maintenance and does not remove the necessity for the sludge beds nor reduce their size which must be sufficient in capacity to enable the sludge to be brought to at least a spadeable condition.

The present invention provides a sewage disposal system or plant which is independent of outside aid such as fuel supply or outlying sludge beds and hauling facilities and which is complete in itself for effecting an accelerated conditioning of the sludge and final disposal thereof in the form of an ash or cinder; with the additional advantages of permitting a reduction in the size of the digester to be used for a given amount of material treated, and a saving in space occupied by the plant as a whole.

This, the main object of the invention, is attained by the cooperative relation of apparatus elements whereby the sludge is digested in a gas collection digester accelerated in its action by the application of heat, the treated sludge from the digester delivered to a dewatering device such as a filter, and the resulting filter cake incinerated in a gas fired incinerator supplied with gas from the digester; the heat from the digester being derived either secondarily from the waste heat of the incinerator or primarily from heating means fired by the digester gas independently of the incinerator.

An important result accruing from this arrangement for heating, combined with local filtering and immediate local incineration, is that the rate of digestion is increased and the degree to which it is necessary to carry digestion is reduced, with the advantage that the digester may be much smaller than usual, relative to the amount of sludge treated. Digestion need be continued simply long enough to obtain about 90 percent of the gas from the sludge operating at about 90° F. This reduces the necessary size of the digester to that required for only 15 to 20 days' digestion.

A preferred embodiment of the invention is described in the following specification and illustrated in the accompanying drawing which is a diagram of an arrangement of apparatus elements constituting a system or plant for carrying out the invention.

Referring to the drawing in detail, the system comprises a clarifier 1, of a type arranged to receive the raw sewage at influent conduit 2, after suitable screening not indicated, and operable to settle out the solids in the form of a thick sludge at the bottom and discharge the clarified liquid through a suitable overflow or effluent conduit 30. A sludge pump 3 is arranged to withdraw this sludge from the bottom of the clarifier through the underflow line 4 and discharge it through sludge line 5 into the top of a digester 6 which is of the gas collection type, having a gas dome 7 and a heating coil 8. The digester is of a type operable to effect digestion of the sludge while working the ripened or digested sludge toward the bottom, the effluent passing out at 9 and the gas collecting in the dome 7 and passing out through the gas line 10.

The underflow 11 of the digester is arranged to deliver the treated sludge to a conditioning tank 12 arranged to deliver the sludge into a filter 13, through a suitable control valve 14. This filter may be of any suitable type, preferably a rotary vacuum filter, and is arranged to deliver the filtered solids or filter cake to an incinerator 15, either directly over the path 16 or through the intermediation of a divider or comminuter 17 according to the physical condition of the filter cake on leaving the filter and the condition best suited to the particular design of the incinerator used. While the incinerator may be of any suitable design, it is desirable that it be of a type capable of utilizing the combustible gas generated in the digester for effecting the incineration of the filter cake substance and may take the form of any known or other suitable type of gas fired incinerator.

Situated in the path of the hot gases leaving the incinerator, is a heat transfer element in the form of a water heating coil 18, preferably so designed and placed as not to interfere with the draft of the incinerator or the odor destroying effect of the heat in the flue gases; to which end it may be placed in the stack or in a passage leading to the stack, beyond the point where substantially complete destruction of odor has taken place. Gas is supplied to the gas burner 19 of the incinerator through gas line 10 from the gas dome 7 of the digester, a gas holder 20 being connected with gas line 10 to store excess gas and to compensate for variations in supply and demand. The water heating coil 18 is connected with the digester heating coil 8 through the hot water lines 21—22. An auxiliary, gas-fired water heater 23, is arranged to be connected in circuit with the digester heating coil 8 through the hot water lines 22—23 and pipes 24—25, its gas burner 26 being connected through a conduit 27 with a main gas line 10 and controlled by a valve 28. The filter 13 is arranged to discharge the filtrate through a suitable discharge conduit 29, which filtrate and the effluent from the digester at 30 may be disposed of in any known or other suitable manner as by conducting them off directly to stream or returning them to the clarifier 1, their liquid content, in the latter case, eventually passing off with the effluent of the clarifier to a natural stream or other usual means of disposal.

Means such as a hopper 31 is provided for collecting the ashes resulting from the incineration of the filter cake, from which hopper the ashes are conveyed into a suitable sifter 32, arranged to cast out the coarse material at 33 and deliver the fine sifted ashes at 34. An ash storage bin 35 is arranged to store these fine ashes for discharge into the conditioning tank 12 as needed. Any known or other suitable means may be provided for conveying the fine sifted ashes from the sifter at 34 to the storage bin 35, as indicated by the line 36. A container 37 is also arranged to store and deliver a suitable chemical filter aid into the conditioning tank 12. The conditioning tank 12 is provided with suitable agitating means such as the rotary paddles 38 for thoroughly mixing its contents. Valves are provided in the various conduits throughout the system, as at 14 and 28 and other places shown in the diagram for control of the operation of the system such as the switching of elements into and out of operative connection, and the control of the rate of flow of the various fluids in different parts of the system.

In the operation of the system above described, in accordance with the preferred method, the raw sewage, after suitable screening when necessary, flows by way of the influent conduit 2 into the clarifier 1 wherein the settleable solids are deposited at the bottom in the form of a sludge, the clarified liquid passing off through the effluent conduit 30. Other material may be fed into the clarifier for treatment along with the raw sewage such as activated sludge derived from further treatment of the effluent from conduit 30. From the bottom of the clarifier 1, the sludge is withdrawn by the sludge pump 3 through the under flow line 4 and delivered through sludge line 5 into the digester 6 where the sludge undergoes digestion while moving toward the bottom, the liquid, including that resulting from digestion passing off through the effluent conduit 9, while the gas resulting from digestion collects in the gas dome 7 and passes off through the main gas line 10. Sludge is withdrawn from the bottom of the digester through the underflow pipe 11 and discharged into the conditioning tank 12, at a rate which will permit a retention of the sludge in the digester for a period of time necessary to carry digestion to a degree of completion sufficient to facilitate dewatering and generate sufficient gas for incinerating the dewatered sludge and heating the contents of the digester to the proper amount. This period of time may be substantially less than that usually required where complete digestion or ripening of the sludge is necessary and in practice may be as little as 15 to 20 days or approximately sufficient to effect about 90 percent of the total possible gas production.

In the conditioning tank 12, suitable filter aid or aids may be added such as a chemical filter aid or a mechanical filter aid or both. Any suitable chemical filter aid may be used such as ferric chloride, and while any suitable mechanical filter aid may be used such as crushed slag or ashes, it is preferable to use the ashes resulting from the incineration of the sludge filter cake which not only makes the system more independent of outside sources, but has been found to be superior to other materials for this purpose, probably due to its iron content. The ashes are added to the contents of the treatment tank from the storage bin 35, and the chemical filter aid is admitted into the tank from the container 37. The treated, digested sludge, after sufficient stirring by the agitator paddles 38, is then delivered into the filter 13 where it is dewatered, the liquid or filtrate separating out as at 29, while the resulting sludge filter cake is conveyed to the incinerator 15, either directly as indicated by the flow line 16, or, where necessary, through the intermediation of a comminuter or shredder 17. The sludge cake, as it leaves the filter, may be dewatered to a moisture content as low as 70%, where the sludge has undergone a digestion of 15 or 20 days.

The filter cake entering the incinerator 15 is incinerated to ashes which pass into the hopper 31 from whence they are passed to the sifter 32, the coarse particles separating out at 33 while the fine ashes are passed on to the storage bin 35 as indicated by the flow line 36. The hot vapors and products of combustion resulting from the incineration of the filter cake, in their passage through the incinerator to the stack, are subjected to heat of sufficient intensity to destroy substantially all odors. The hot vapors and gases passing out through the stack impart a portion of their heat to the hot water coil 18 from whence the heat is transferred to the digester heating coil 8 by circulation of water through these coils and the hot water lines 21—22. At times when the incinerator is not in operation, heat is supplied by the auxiliary heater 23.

The digestion of the sludge, accelerated by the heat derived from the incinerator or from the auxiliary heater, produces a combustible gas which passes by way of gas line 10 to the incinerator 15 to effect incineration of the sludge. Excess gas produced mostly during non use of the incinerator, is stored in the gas holder 20 to be utilized during high demand such as prolonged operation of the incinerator.

While a particular example of the method of and apparatus arrangement for, carrying out the invention, have been described in detail for the purpose of disclosure, it is to be understood that the invention is not limited to such particular example as to method and apparatus, but contemplates all such variations and modifications thereof as fall fairly within the scope of the appended claims.

Having thus described the invention, what I claim is:

1. The process of disposing of sewage sludge which comprises subjecting the sludge to a combustible-gas-producing digestion, heating the sludge during digestion, dewatering the digested sludge to remove a portion of its moisture content, incinerating the dewatered sludge, and collecting and utilizing the gas produced by digestion to effect said heating and incineration, said step of digestion being carried to a degree less than that of complete digestion but sufficient to produce the quantity of gas necessary for effecting said warming and incineration.

2. In a sewage disposal system, a gas-collecting digester, a conditioning tank arranged to receive digested sludge from the digester, a gas fired incinerator, a sludge filter arranged to receive sludge from the conditioning tank and deliver the sludge filter-cake to the incinerator, means for conducting fuel gas from the digester to the incinerator, a fluid heat exchanger arranged in heat exchanging relation with the contents of said digester, a primary fluid heat exchanger arranged to be heated by the waste heat from the incinerator, fluid conducting means connecting said heat exchangers, an auxiliary fluid heater arranged to be connected with said fluid conducting means, gas firing means for said auxiliary fluid heater arranged to be operatively connected with said fuel gas conducting means, and a gas holder connected with said fuel gas conducting means.

In testimony whereof I affix my signature.

RENVILLE S. RANKIN.